US007190374B2

(12) United States Patent
Lake et al.

(10) Patent No.: US 7,190,374 B2
(45) Date of Patent: Mar. 13, 2007

(54) SHADING POLYGONS FROM A THREE-DIMENSIONAL MODEL

(75) Inventors: Adam T. Lake, Portland, OR (US); Carl S. Marshall, Portland, OR (US); Marc S. Blackstein, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 09/796,331

(22) Filed: Feb. 28, 2001

(65) Prior Publication Data

US 2002/0118212 A1 Aug. 29, 2002

(51) Int. Cl.
G09G 5/00 (2006.01)

(52) U.S. Cl. .................. 345/606; 345/610; 345/619; 345/581; 345/441; 345/467

(58) Field of Classification Search ............... 345/606, 345/610, 581, 619, 441, 467
See application file for complete search history.

(56) References Cited

U.S. PATENT DOCUMENTS

| | | | |
|---|---|---|---|
| 4,600,919 A | | 7/1986 | Stern |
| 4,747,052 A | | 5/1988 | Hishinuma et al. |
| 4,835,712 A | | 5/1989 | Drebin et al. |
| 4,855,934 A | | 8/1989 | Robinson |
| 4,901,064 A | | 2/1990 | Deering |
| 5,124,914 A | | 6/1992 | Grangeat |
| 5,163,126 A | | 11/1992 | Einkauf et al. |
| 5,371,778 A | | 12/1994 | Yanof et al. |
| 5,517,263 A | * | 5/1996 | Minich et al. ............ 345/419 |
| 5,611,030 A | | 3/1997 | Stokes |
| 5,731,819 A | | 3/1998 | Gagne et al. |

(Continued)

OTHER PUBLICATIONS

Foley et al., "Computer graphics: principal and practice" Addison–Wesley Publishing Company, 1060–1064, Reading, MA 1996.
Popovic et al., "Progressive Simplicial Complexes" Microsoft Research, http://www.research.microsoft.com/–hoppe/, 1997.
Taubin et al., "Progressive Forest Split Compression" IBM T.J. Watson Research Center, Yorktown Heights, NY, (1998).
Cohen–Or et al., "Progressive Compression of Arbitrary Triangular Meshes" Computer Science Department, School of Mathematical Sciences, Tel Aviv, Israel, pp. 67–72, Oct. 1999.
Bajaj et al., "Progressive Compression and Transmission of Arbitrary Triangular Meshes" Department of Computer Sciences, University of Texas at Austin, Austin, TX, pp. 307–316 (1999).
Alliez et al., "Progressive Compression for Lossless Transmissions of Triangle Meshes" University of Southern California, Los Angeles, CA, 195–202, Aug. 2001.
Chow "Optimized Geometry Compression for Real–time Rendering" Massachusetts Institute of Technology, Proceedings Visualization 1997, Oct. 19–24, 1997, Phoenix, AZ, 347–354.

(Continued)

*Primary Examiner*—Kee M. Tung
*Assistant Examiner*—Manucher Rahmjoo
(74) *Attorney, Agent, or Firm*—Fish & Richardson P.C.

(57) ABSTRACT

Shading a polygon includes identifying points on edges of the polygon using shading values for vertices of the polygon, connecting the points to form at least two areas within the polygon, and shading the at least two areas differently. Vertices are assigned to at least two different bins. The bins correspond to different shades. The points may be identified by identifying points on edges of the polygon having vertices assigned to different bins.

27 Claims, 9 Drawing Sheets

U.S. PATENT DOCUMENTS

| | | | |
|---|---|---|---|
| 5,757,321 A | 5/1998 | Billyard | |
| 5,786,822 A | 7/1998 | Sakaibara et al. | |
| 5,805,782 A | 9/1998 | Foran | |
| 5,809,219 A * | 9/1998 | Pearce et al. | 345/426 |
| 5,812,141 A | 9/1998 | Kamen et al. | |
| 5,847,712 A | 12/1998 | Salesin et al. | |
| 5,894,308 A | 4/1999 | Isaacs | |
| 5,929,860 A | 7/1999 | Hoppe | |
| 5,933,148 A * | 8/1999 | Oka et al. | 345/427 |
| 5,949,969 A | 9/1999 | Suzuoki et al. | |
| 5,966,133 A | 10/1999 | Hoppe | |
| 5,966,134 A | 10/1999 | Arias | |
| 5,974,423 A * | 10/1999 | Margolin | 345/606 |
| 6,054,999 A | 4/2000 | Strandberg | |
| 6,057,859 A | 5/2000 | Handelman et al. | |
| 6,078,331 A * | 6/2000 | Pulli et al. | 345/423 |
| 6,115,050 A | 9/2000 | Landau et al. | |
| 6,175,655 B1 | 1/2001 | George, III et al. | |
| 6,191,655 B1 | 2/2001 | Moughabghab | |
| 6,191,787 B1 * | 2/2001 | Lu et al. | 345/418 |
| 6,191,796 B1 | 2/2001 | Tarr | |
| 6,198,486 B1 | 3/2001 | Junkins et al. | |
| 6,201,549 B1 | 3/2001 | Bronskill | |
| 6,208,347 B1 | 3/2001 | Migdal et al. | |
| 6,219,070 B1 | 4/2001 | Baker et al. | |
| 6,239,808 B1 | 5/2001 | Kirk et al. | |
| 6,252,608 B1 | 6/2001 | Snyder et al. | |
| 6,262,737 B1 | 7/2001 | Li et al. | |
| 6,262,739 B1 | 7/2001 | Migdal et al. | |
| 6,292,192 B1 | 9/2001 | Moreton | |
| 6,317,125 B1 | 11/2001 | Persson | |
| 6,337,880 B1 | 1/2002 | Cornog et al. | |
| 6,356,263 B2 * | 3/2002 | Migdal et al. | 345/423 |
| 6,388,670 B2 | 5/2002 | Naka et al. | |
| 6,405,071 B1 | 6/2002 | Analoui | |
| 6,437,782 B1 | 8/2002 | Pieragostini et al. | |
| 6,478,680 B1 | 11/2002 | Yoshioka et al. | |
| 6,559,848 B2 | 5/2003 | O'Rourke | |
| 6,593,924 B1 | 7/2003 | Lake et al. | |
| 6,593,927 B2 | 7/2003 | Horowitz et al. | |
| 6,608,627 B1 | 8/2003 | Marshall et al. | |
| 6,608,628 B1 | 8/2003 | Ross et al. | |
| 2001/0026278 A1 | 10/2001 | Arai et al. | |
| 2002/0101421 A1 | 8/2002 | Pallister | |

OTHER PUBLICATIONS

Markosian "Real–Time Nonphotorealistic Rendering" Brown University site of the NSF Science and Technology Center for Computer Graphics and Scientific Visualization, Providence, RI (1997).

Elber "Line Art Rendering via a Coverage of Isoperimetric Curves", IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes"Brown University site of the NSF Science and Technology Center for Computer Graphics and Scientific Visualization, 1996.

Lansdown et al., "Exposure Rendering: A Review of Non-photorealistic Techniques" IEEE Computer graphics and Applications, 29–37, 1995.

Raskar "Image Precision Silhouette Edges" University of North Carolina at Chapel Hill, Microsoft Research, 1999 Symposium on Interactive 3D Graphics, Atlanta, GA, 135–231, 1999.

Samet "Applications of spatial data structure: computer graphics, image processing, and GIS" University of Maryland, Addison–Wesley Publishing Company, 325–398, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA (1998).

Sousa, M. and Buchanan, J., "Computer–Generated Graphite Pencil Rendering of 3D Polygonal Models". *Eurographics '99*,18(3):C–193 –C207 (1999).

Elber, G., "Interactive Line Art Rendering of Freeform Surfaces", *Eurographic '99* , 18(3):C1 –C12 (1999).

Heidrich, W. and Seidel, H., "Realistic, Hardware–Accelerated Shading and Lighting ", *Computer Graphics Proc., Annual Conference Series*, (Siggraph '99), PP. 171–178 (1999).

Appel Arthur, "The Notion of Quantitative Invisibility and the Machine Rendering of Solids." Proceedings of 22nd National Conference Association for Computing Machinery 1967.

Buck et al., "Performance–Driven Hand Drawn Animation", ACM (NPAR2000), pp. 101–108 (2000).

Catmull et al., "Recurively Generated B–Spline Surfaces on Arbitrary Topological Meshes," Computer Aided Design, 10(6):350–355 (1978).

Coelho et al., "An Algorithm for Intersecting and Trimming Parametric Meshes", ACM SIGGRAPH, pp. 1–8 (1998).

Deering M., "Geometry Compression,"Computer Graphics. SIGGRAPH '95, PP. 13–20, 1995.

DeRose et al., "Subdivisional Surfaces in Character Animation", ACM SIGGRAPH'98, pp. 85–94 (1998).

et al., "A Non–Photorealistic Lighting Model for Automatic Technical Illustration," Computer Graphics Proceedings, Annual Conference Series, SIGGRAPH'96, PP. 447–452 (1998).

Gooch et al., "Interactive Technical Illustration," ACM Interactive 3D, pp. 31–38 (1999).

Heidrich et al., "Realistic, Hardware–Accelerated Shading and Lighting", ACM, (SIGGRAPH'99), pp. 171–178 (1999).

Hoppe, H., "Progressive Meshes," URL: http://ww.research.microsoft.com/research/graphics/hoppe, (10 pgs.).

Hoppe, H., "Efficient Implementation of Pogressive Meshes," Comput. & Graphics, 22(1), pp. 27–36 (1998).

Kumar et al., "Interactive Display of Large Scale NURBS Models", ACM, Symp. On Interactive 3D Graphics, pp. 51–58 (1995).

Lander, Jeff, "Making Kine More Flexible," Game Developer Magazine, 5pgs., Nov. 1998.

Lander, Jeff, "Skin Then Bones," Game Developer Magazine, 4 pgs., May 1996.

Lasseter, J. et al., "Principles of Traditional Animation Applied to 3D Computer Animatioin," ACM, pp. 35–44 (1987).

Lee, M. et al., "Navigating Through Triangle Meshes Implemented as Linear Quadtrees," ACM Transactions on Graphics, 19(2):79–121 (2000).

Lewis, J . P. et al., "Pose Space Deformation: A Unified Approach to Shape Interpolation and Skeleton–Driven Deformation," ACM, (SIGGRAPH 2000), pp. 163–172 (2000).

Pajarola et al., "Compressed Progressive Meshes" IEEE Transactions on Visualization and Computer Graphics, 6(1):79–93 (2000).

Pedersen, "A Framework for Interactive Texturing on Curved Surfaces", ACM, pp. 295–301 (1996).

pmG Introduces Messiah: Animate 3.0, URL: http://www.digitalproducer.com/aHTM/Articles/july_2000/july_1700/pmg_intros_messiahanimat e.htm (Accessed Oct. 26, 2004) 2 pgs.

Pueyo, X. et al., "Rendering Techniques '96", Proc. of Eurographics Rendering Workshop 1996, EUROGRAPHICS, pp. 61–70 (1996).

"Rockwood , A. et al., Real–time Rendering of Trimmed Surfaces," Computer Graphics (SIGGRAPH '89 Proceedings) 23:107–116 (1989).

Stam, J., "Exact Evaluation of Catmull–Clark Subdivision Surfaces at Arbitrary Parameter Values," SIGGRAPH 98 Conference Proceedings, Annual Conference Series, pp. 395–404 (1998).

Taubin et al., "3D Geometry Compression", SIGGRAPH'98 Current Notes (1998.

Thomas (Contributor) et al., "The Illusion of Life: Disney Animation"47–51.

Wihelms, J. & Van Gelder, A., University of California, Santa Cruz [online], 1997, [retrieved 2004–12–28]. Retrieved from the Internet: <URL:http://graphics.stanford.edu/ciyrses.cs448–01–spring/papers/wilhelms/pdf>.

* cited by examiner

SHADING POLYGONS FROM A THREE-DIMENSIONAL MODEL

TECHNICAL FIELD

This invention relates to shading polygons from a three-dimensional (3D) model to render a non-photorealistic two-dimensional (2D) image.

BACKGROUND

Non-photorealistic images are rendered from 3D models by projecting polygons that make up the 3D model onto a 2D surface and shading the polygons. The polygons are shaded to achieve a cartoon-like effect that does not too closely approximate real life. Existing shading techniques include determining shading values for vertices of the polygons and shading the polygons based on those shading values.

DESCRIPTION

Figure 1:
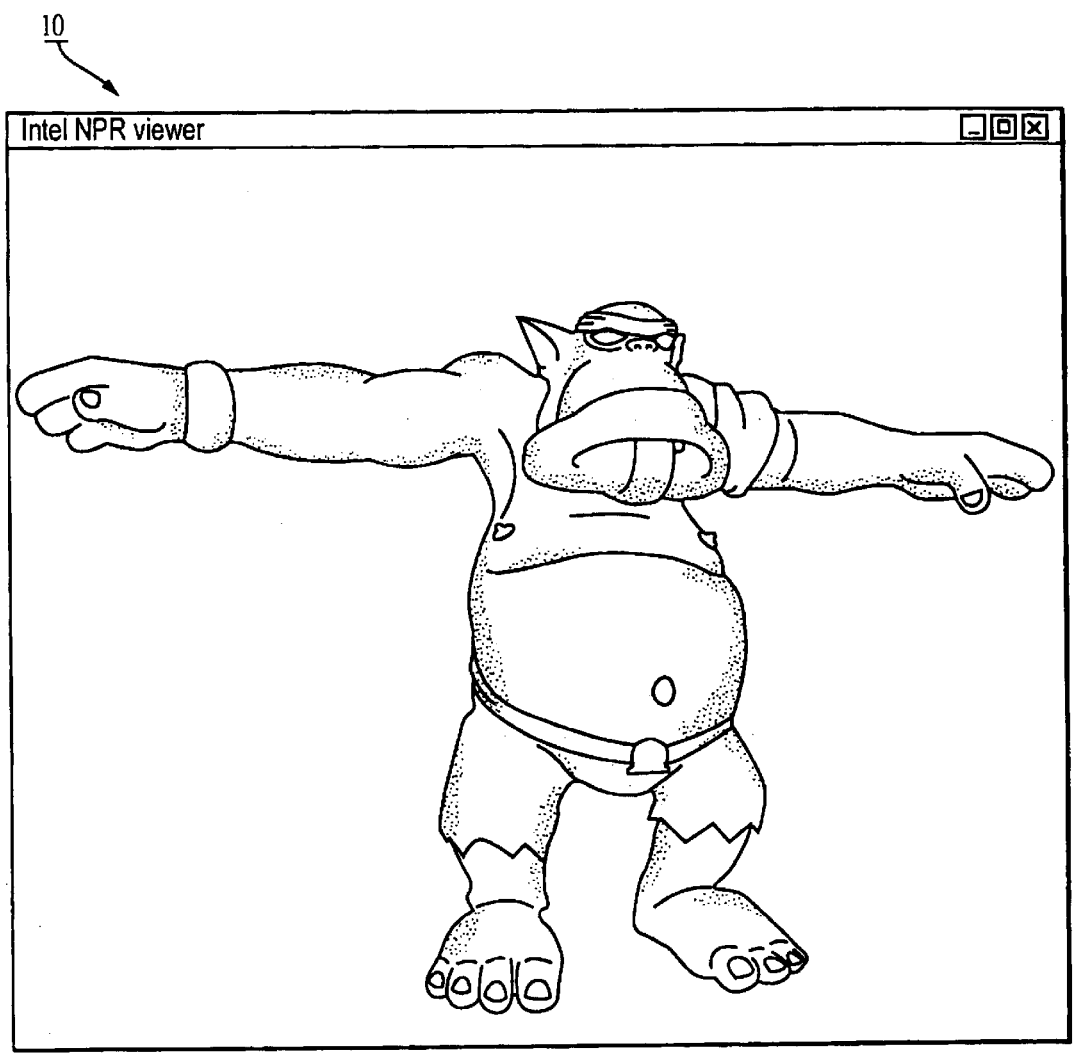
FIG. 1 is a view of a Gouraud-shaded 3D model.
Figure 2:
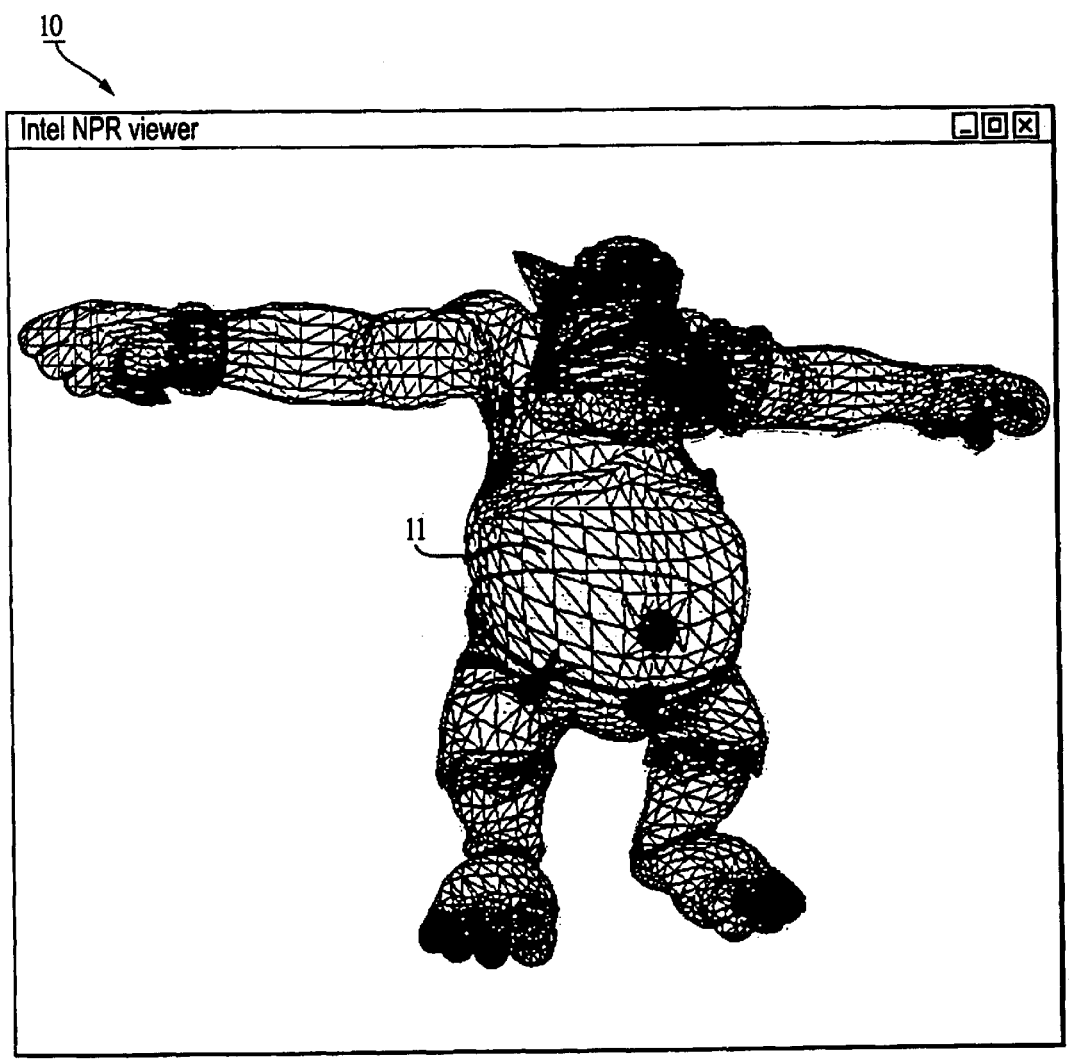
FIG. 2 is a wireframe view of polygons in the 3D model.

FIG. 1 shows a 3D model 10. 3D model 10 is a Gouraud-shaded model defined by 3D data. Gouraud-shading is a shading technique that achieves a 3D, or "photorealistic", effect. As shown in FIG. 2, the 3D data defines interconnecting polygons 11, which comprise 3D model 10. Polygons 11 are triangles in this embodiment; however, other types of polygons may be used to construct 3D model 10.

Figure 3:
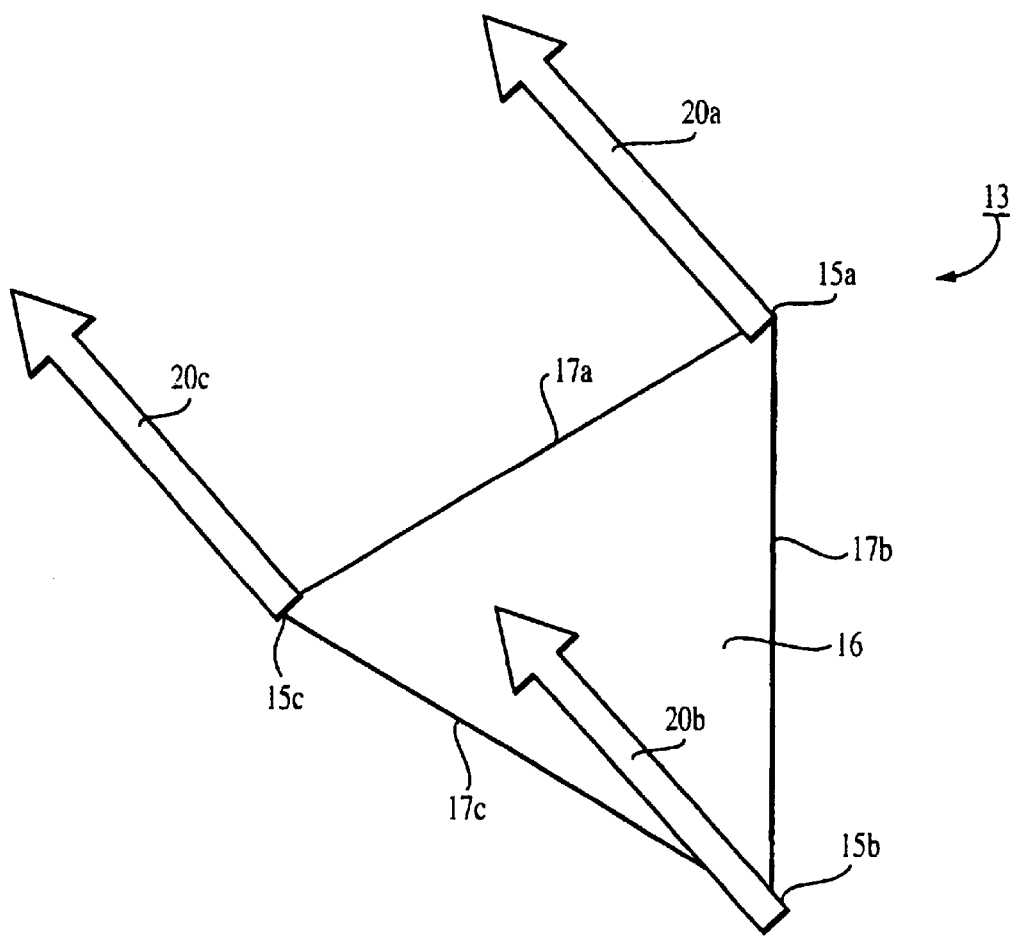
FIG. 3 is a view of one of the polygons.

Referring to FIG. 3, the 3D data for a polygon 13 is comprised of coordinates for three vertices 15*a*, 15*b* and 15*c* positioned in Cartesian XYZ (or other) space. These vertices define a face 16 and edges 17*a*, 17*b* and 17*c* for the polygon.

Figure 4:
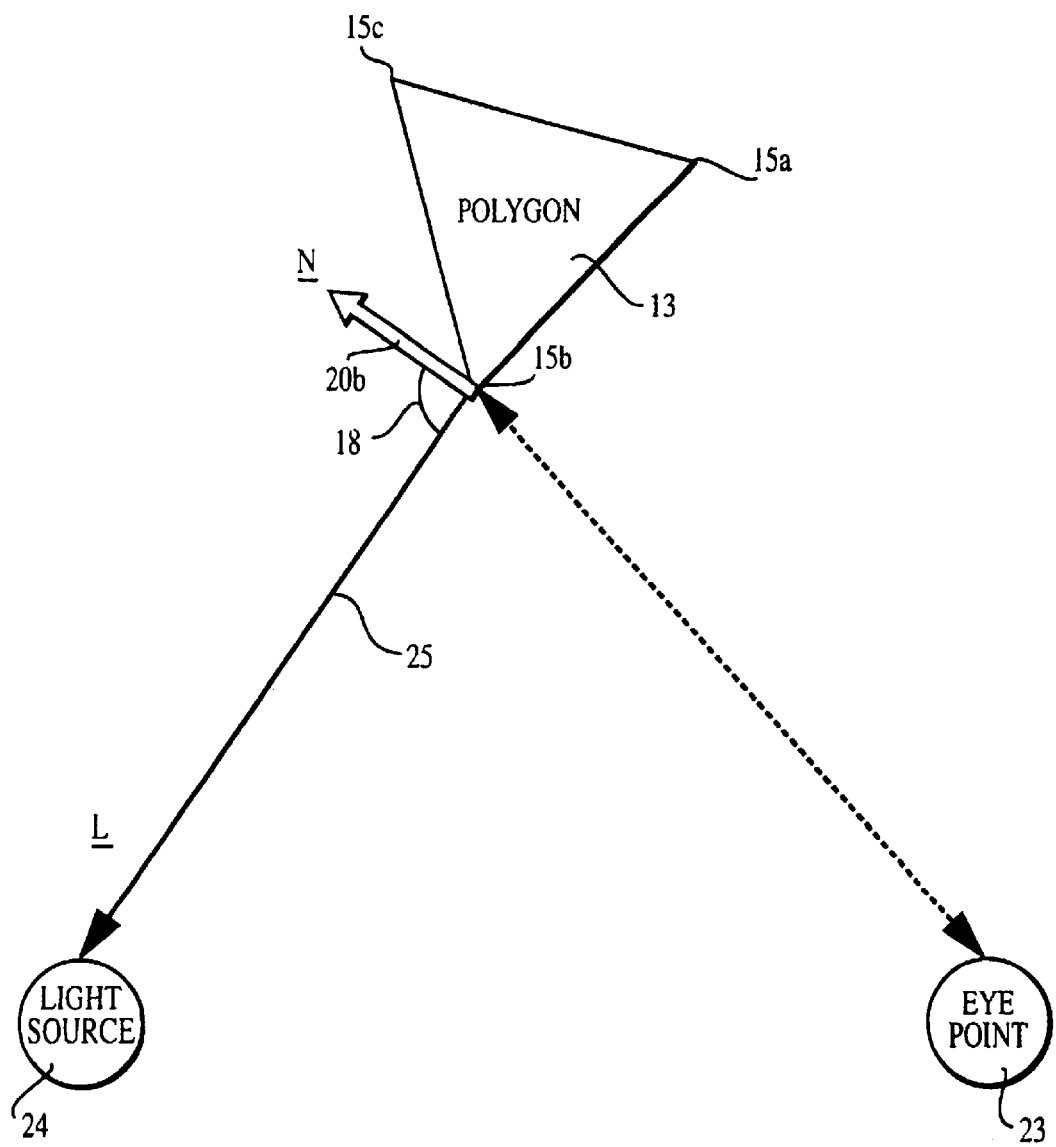
FIG. 4 is a view of light hitting the polygon.

A unit normal vector ("normal") 20*a*, 20*b* and 20*c* at each respective vertex 15*a*, 15*b* and 15*c* affects how the vertex is perceived relative to a predefined reference point (the "eye-point" 23 in FIG. 4) in the "virtual world" that 3D model 10 inhabits. Taking vertex 15*b* as an example in FIG. 4, normal 20*b* determines the amount of light that reaches vertex 15*b* from a predefined light source 24 in the virtual world. The amount of light is determined using the dot product of unit normal 20*b* and a unit vector 25 from the light source. The dot product value defines the cosine of angle 18 between the light and the normal. The shading applied to each polygon face is determined based on this angle, as described below. Coordinates for the normals may be stored with the 3D data for each vertex. Alternatively, a normal may be computed "on-the-fly" during the image rendering process described below.

Figure 5:
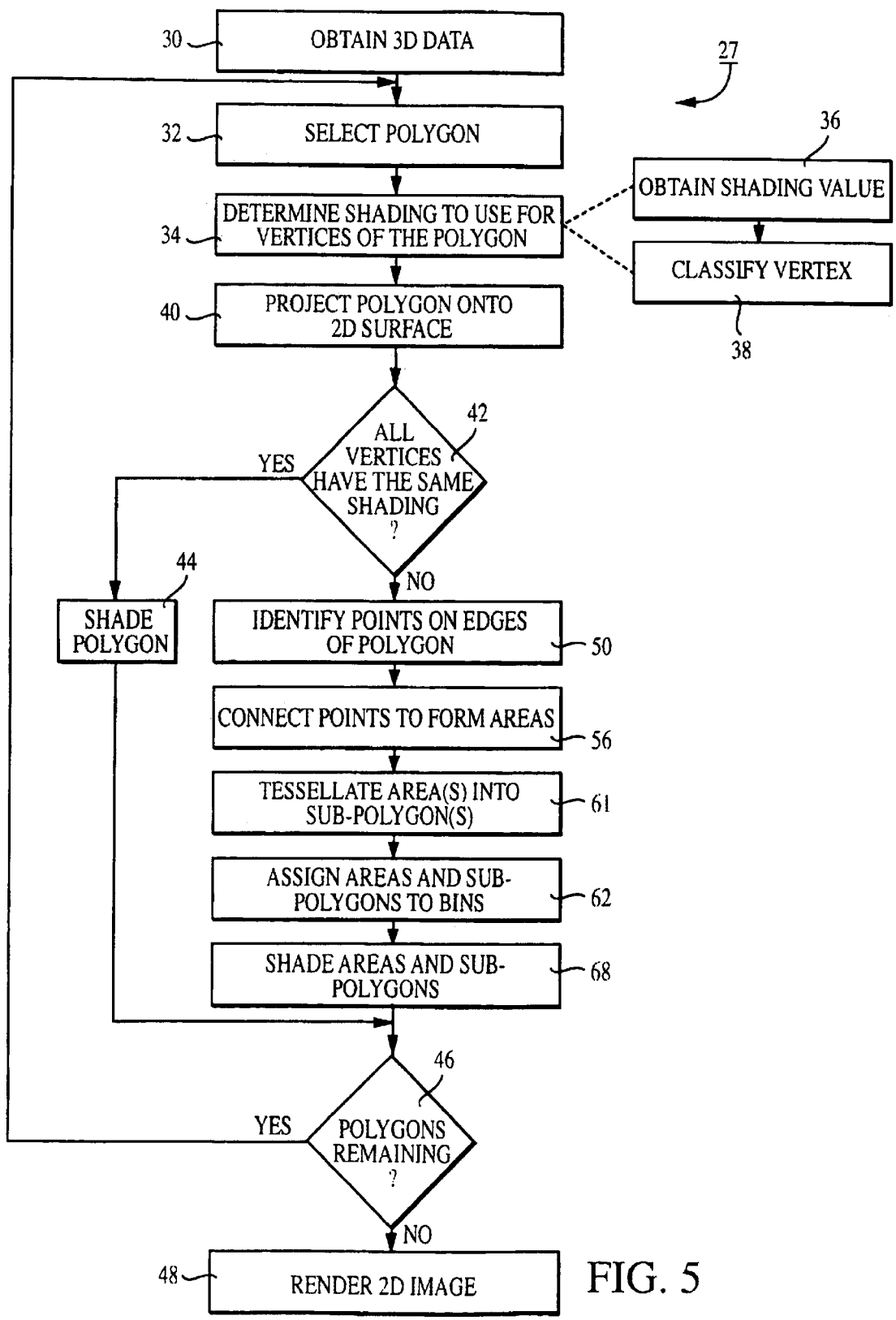
FIG. 5 is a flowchart of a process for shading polygons to generate a non-photorealistic 2D image.

FIG. 5 shows a process 27 for rendering non-photorealistic images from a 3D model, such as 3D model 10. Examples of non-photorealistic shading techniques include cartoon shading and pencil-sketch shading. Briefly, cartoon shading provides non-gradual transitions between differently-shaded image areas. This achieves a non-photorealistic 2D effect. Pencil-sketch shading approximates shading and depth by varying the placement and density of discrete line segments. Unlike traditional Gouraud shading, where transitions between light and dark regions of an image are gradual, pencil-sketching uses hard edge boundaries between regions. That is, pencil-sketch shading creates transitions between regions by terminating line segments in the regions, not by blending one neighboring region into another region.

Figure 6:
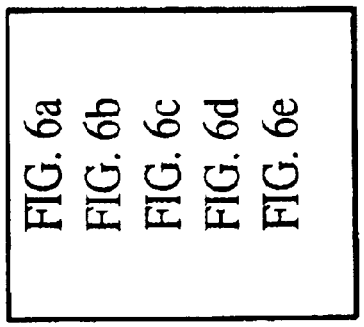
FIG. 6, comprised of FIGS. 6*a* to 6*e*, shows examples of bitmap images for use in shading polygons.
Figure 6A:
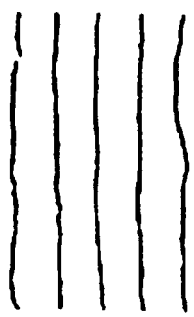

Process 27 uses bitmap images to shade polygons of 3D image 10. In this embodiment, the bitmap images are pencil-sketch texture maps; however, as noted above, the bitmap images may be solid but differently shaded texture maps (for, e.g., cartoon shading). The bitmap images may be stored in memory, from which they are retrieved by process 27. Examples of pencil-sketch bitmap images that may be used by process 27 are shown in FIG. 6. Other bitmap images may also be used.

Referring to FIG. 5, process 27 obtains (30) 3D data for 3D model 10. The data may be received from a network such as the Internet, retrieved from memory, or obtained from any other available source. Process 27 selects (32) a polygon from the 3D data, selects a vertex of the polygon, and determines (34) which shading, meaning which bitmap image, to use in shading the vertex of that polygon. Process 27 does this based on the way that the polygon is illuminated, i.e., based on light that hits the vertex. To determine how light hits a vertex, process 27 obtains (36) a shading value for the vertex using its vertex normal (see, e.g., FIG. 4).

By way of example, for vertex 15*b* of polygon 13 (FIG. 4), process 27 calculates the vector dot product of unit normal vector 20*b* ($\underline{N}$) and unit light vector 25 ($\underline{L}$). Since $\underline{N}$ and $\underline{L}$ are both unit vectors, the product of $\underline{N} \cdot \underline{L}$ is the cosine of the angle 18 formed between the two vectors. If the angle between $\underline{N}$ and $\underline{L}$ is small, then the diffuse component of smooth shading is high and $\underline{N} \cdot \underline{L}$ will have a value close to one. If the angle is large, then the amount of diffuse component in smooth shading is low and $\underline{N} \cdot \underline{L}$ has a value close to zero.

Process 27 takes the maximum of the resulting dot product ($\underline{N} \cdot \underline{L}$) and zero, i.e., Max($\underline{N} \cdot \underline{L}$, 0) and obtains (36) a shading value for the vertex that is proportional to the maximum of the dot product. The maximum is taken to discount polygons that are in the back of the 3D model relative to the light source and, thus, which produce a negative $\underline{N} \cdot \underline{L}$ value.

For each vertex 15*a*, 15*b* and 15*c* of polygon 13, process 27 obtains (36) a shading value. Process 27 classifies (38) each vertex based on the obtained shading values. That is, process 27 uses the shading values to assign each vertex of polygon 13 to one of M (M≧1) bins in memory. Each of the bins holds a predetermined range of shading values. For example, process 27 might use three bins having intervals of [0,a], (a,b] and (b,1], where "a" and "b" are adjustable shading values with a<b, 0≦a and b≦1, and where square brackets indicate exclusion and parenthetic brackets indicate exclusion. For example, "a" is included in the range [0,a] but excluded from the range (a,b]. So, in this example, if a shading value of vertex 15*b* is "a", vertex 15*b* will be associated with bin [0,a]. Different numbers and/or ranges of bins may be used in process 27. A bitmap image is assigned to each bin. Each vertex in that bin is shaded using the assigned bitmap image, as described below.

Once process 27 determines the shading for each vertex, process 27 projects (40) polygon 13 onto a 2D surface. This is done by determining the Cartesian XY coordinates of polygon 13 on a 2D surface. Process then forms a 2D representation of the original 3D polygon onto the 2D surface.

Process 27 determines (42) if all vertices of polygon 13 are assigned to the same bin, in which case all of the vertices would be shaded using the same bitmap image. If this is the case (42), process 27 shades (44) the entire polygon 13 using the bitmap image that corresponds to the bin to which the vertices are assigned. Process 27 does this by mapping the appropriate bitmap image to the polygon using a conventional texture mapping technique. Thereafter, process 27 determines (46) if polygons remain in the 3D data. If so, process 27 returns to 32. If not, process 27 proceeds to 48.

Returning to 42, if process 27 determines (42) that at least two of the vertices of polygon 13 are in different bins, process 27 proceeds to 50. Two vertices in different bins means that polygon 13 is part of a boundary between two differently-shaded regions. In this case, process 27 subdivides polygon 13 and shades the resulting sub-polygons to achieve a more granular boundary between the differently-shaded regions. This is described in more detail below.

Figure 6B:
Figure 6C:
Figure 6D:
Figure 7:
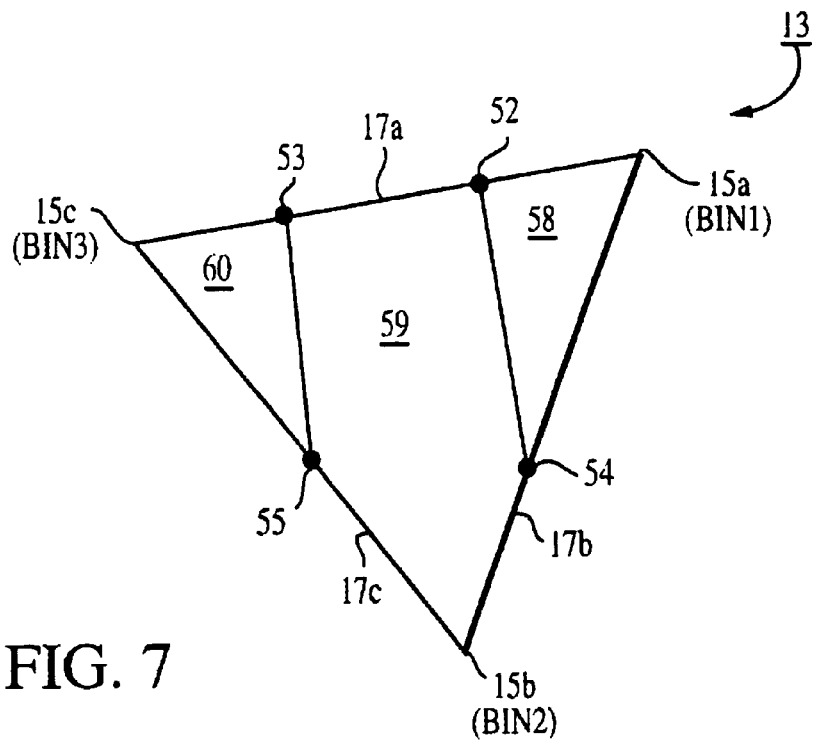
FIGS. 7 and 8 show a polygon divided into sub-polygons.
Figure 8:
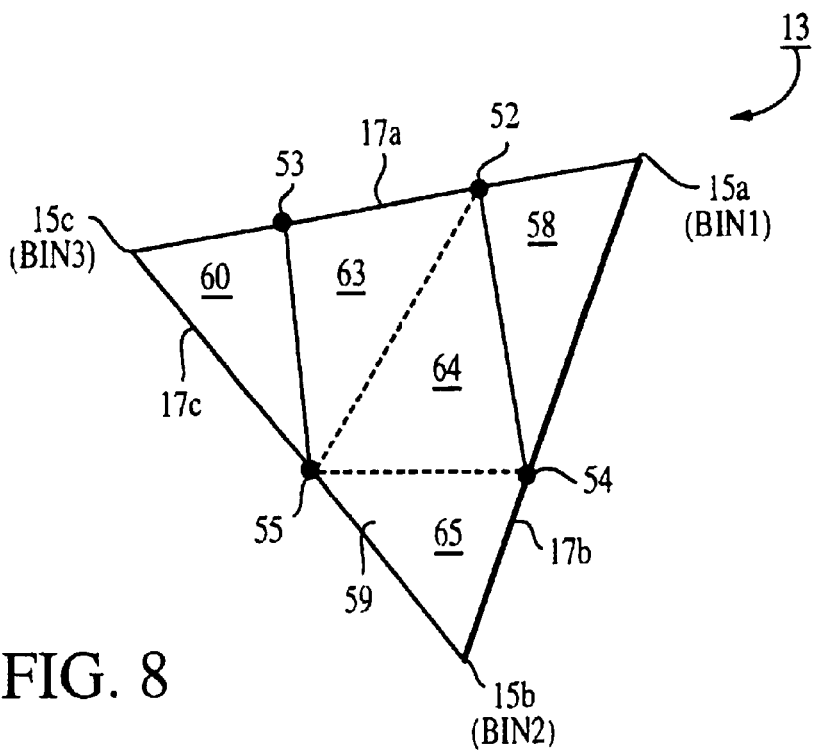

The remainder of process 27 will be described with respect to polygon 13 as it is shown in FIGS. 7 and 8. As a result of the processing performed in block 34, vertex 15a is assigned to a first bin (BIN1), vertex 15b is assigned to a second bin (BIN2), and vertex 15c is assigned to a third bin (BIN3). In this example, BIN1 corresponds to a bitmap image having the "lightest" shading, BIN2 corresponds to a bitmap image having "darker" shading than BIN1, and BIN3 corresponds to a bitmap image having the "darkest" shading of the three. For example, BIN1 may contain vertices having shading values from 0.0 to (but not including) 0.4 that are assigned the bitmap image of FIG. 6b, BIN2 may contain vertices having shading values from 0.4 to (but not including) 0.6 that are assigned the bitmap image of FIG. 6c, and BIN3 may contain vertices having shading values from 0.6 to 1.0 that are assigned the bitmap image of FIG. 6d. Thus, polygon 13 defines boundaries between three different shading levels—the BIN1, BIN2 and BIN3 shading levels. Shading values are numbers assigned by process 27 and have no units.

Referring back to FIG. 5, process 27 identifies (50) points on edges 17a, 17b and 17c using shading values for the vertices of polygon 13. Generally, process 27 only need identify points between vertices assigned to different bins; however, since all three vertices of polygon 13 are assigned to different bins, process 27 identifies points on all three edges. Two points 52 and 53 are identified on edge 17a because BIN1 includes vertices that are different from those in BIN3 by two shading levels, as noted above. The reason for identifying two points on edge 17a is described below.

The locations of the points on edges 17a, 17b and 17c are determined by performing a linear interpolation to find cut-off points between the shading levels that are assigned to two adjacent vertices. By way of example, assume that vertex 15a has a shading value of 0.1 and that vertex 15a corresponds to a bitmap image having a shading level of FIG. 6b which means that vertex 15a will ultimately be overlaid with a bitmap image having the shading level of FIG. 6b). Assume also that vertex 15b has a shading value of 0.5 and that BIN2 corresponds to a bitmap image having a shading level of FIG. 6c. Process 27 determines the location of the cut-off point 54 between shading levels of FIGS. 6b and 6c, meaning the boundary between the shading levels FIGS. 6b and 6c. Process 27 performs the linear interpolation using the actual shading values of vertices 15a and 15b namely 0.1 and 0.5, respectively. As a result, the location of the cut-off point (0.4) will be closer to vertex 15b than to vertex 15a, since 0.4 is closer to 0.5 (vertex 15b) than to 0.1 (vertex 15a). The same process is used to find the location of the cut-off point 55 between vertices 15b and 15c.

Assume further that vertex 15c corresponds to a bitmap image having a shading value of 0.7 (BIN3). Thus, vertices 15a and 15c are assigned to bins that are two shading levels apart, i.e., BIN1 corresponds to a bitmap image having a shading level of FIG. 6b and BIN3 corresponds to a bitmap image having a shading level of FIG. 6d. This means that there are three levels of shading within polygon 13. Process 27 recognizes this and reacts by identifying two points 52 and 53 between vertices 15a and 15c. Identifying the two points 52 and 53 enables process 27 to provide three levels of shading in polygon 13, as described in more detail below.

For vertices 15a and 15c, process 27 determines the location of the cut-off point between the shading levels of FIG. 6b (vertex 15a) and FIG. 6c and the cut-off point (0.6) between the shading levels of FIG. 6c and FIG. 6d (vertex 15c). Linear interpolation is performed in the manner described above to identify points 52 and 53 using the shading levels of vertices 15a and 15c.

Once process 27 identifies points 52, 53, 54 and 55, process 27 connects (56) each pair of analogous bin boundary points from different edges. This means, e.g., that process 27 connects points 52 and 54, which are both are at a shading value of 0.4, and points 53 and 55, which are both are at a shading value of 0.6. Connecting the points in this manner splits polygon 13 into three separate areas 58, 59 and 60.

Areas 58, 59 and 60 define different shading regions. That is, area 58 is shaded with the bitmap image assigned to BIN1 (vertex 15a), area 59 is shaded with the bitmap image assigned to BIN2 (vertex 15b), and area 60 is shaded with the bitmap image assigned to BIN3 (vertex 15c). In order to shade the areas, however, a graphics processor requires that the areas be broken-up into polygons that have the same basic shape as polygon 13. For example, if polygon 13 is a triangle, as it is in this embodiment, areas 58, 59 and 60 need to be broken-down into triangles in order to shade them using the graphics processor. Therefore, process 27 tessellates (61) the areas, as necessary, to form sub-polygons having substantially the same shape as original polygon 13. In this case, original polygon 13 is a triangle; therefore, the sub-polygons should be triangles as well.

Tessellation may be performed by using a conventional subdivision process. In the example of FIG. 7, areas 58 and 60 are already triangles and, therefore, do not need to be subdivided. Area 59, however, is not a triangle and needs to be subdivided into triangles. To do this, process 27 connects points 54 and 55 and points 52 and 55, as shown in FIG. 8. Connecting the points in this manner breaks area 59 down into three triangles 63, 64 and 65. Area 59 is subdivided until the appropriately-shaped polygons are obtained. If the area cannot be broken down into only appropriately-shaped polygons, the excess portions of area 59 may be excluded.

Process 27 assigns (62) triangles 63, 64 and 65 to BIN2. Process 27 assigns (62) area 58 to BIN1 and area 60 to BIN3. Process 27 shades (68) each polygon (in this case, each triangle) with the bitmap image for its corresponding bin. Thus, polygon 58 is shaded using the bitmap image associated with BIN1. Polygon 60 is shaded using the bitmap image associated with BIN3. Polygons (triangles) 63, 64 and 65 are shaded with the bitmap image associated with BIN2.

If any polygons remain in the 3D data (46) for model 10, process 27 returns to 32, where a new polygon is selected and process 27 is repeated for that polygon. Once all polygons have been processed, process 27 renders (48) the resulting non-photorealistic 2D image from the shaded polygons.

Figure 9:
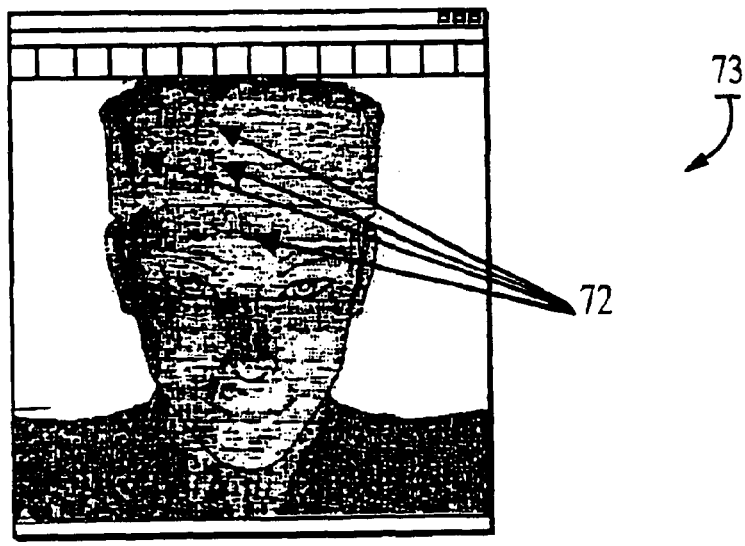
FIG. 9 shows a pencil-sketch image generated by a prior art 2D rendering process.
Figure 10:
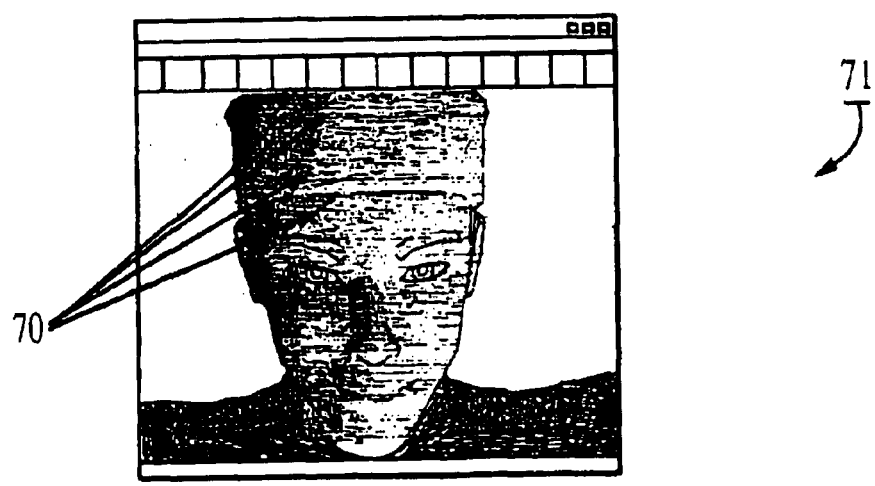
FIG. 10 shows a pencil-sketch image generated by the process of FIG. 5.

Since areas 58, 59 and 60 are shaded using different bitmap images, the effect of the shading is to produce a non-photorealistic 2D image with relatively precise shading boundaries. For example, FIGS. 9 and 10 contrast pencil-sketch shading performed according to a conventional process (FIG. 9) and pencil-sketch shading performed according to process 27 (FIG. 10). The boundaries 70 of shading regions on image 71 (FIG. 10) are smoother than the boundaries 72 of shading regions on image 73 (FIG. 10). Image 71 thus more closely-approximates a hand-drawn image than image 73.

Moreover, because process 27 only subdivides areas that do not already have the same shape as the original polygon (e.g., area 59 but not area 58), an excessive amount of processing need not be performed by the graphics processor.

Process 27 may be used to create animation cels for cartooning. For example, a 3D model, such as model 10, may be generated, and then positioned in a desired manner. Process 27 may be executed on the model to produce a shaded 2D image for that position. Then, the 3D model 10 can be re-positioned (e.g., rotated), and process 27 executed on the re-positioned model to produce a shaded 2D image for a different perspective of the model. This process may be repeated to produce shaded 2D images for any number of model positions. Thus, process 27 can generate animation cels automatically, meaning without the use of hand-drawn sketches.

Process 27 runs in real-time, which facilitates the animation process. That is, in conventional hand-drawn animation, artists cannot interactively change the appearance/view of a character without re-drawing the character manually. Process 27 permits this because it renders frames of animation (i.e., 2D images) dynamically and automatically for a given viewpoint in real-time.

Figure 11:
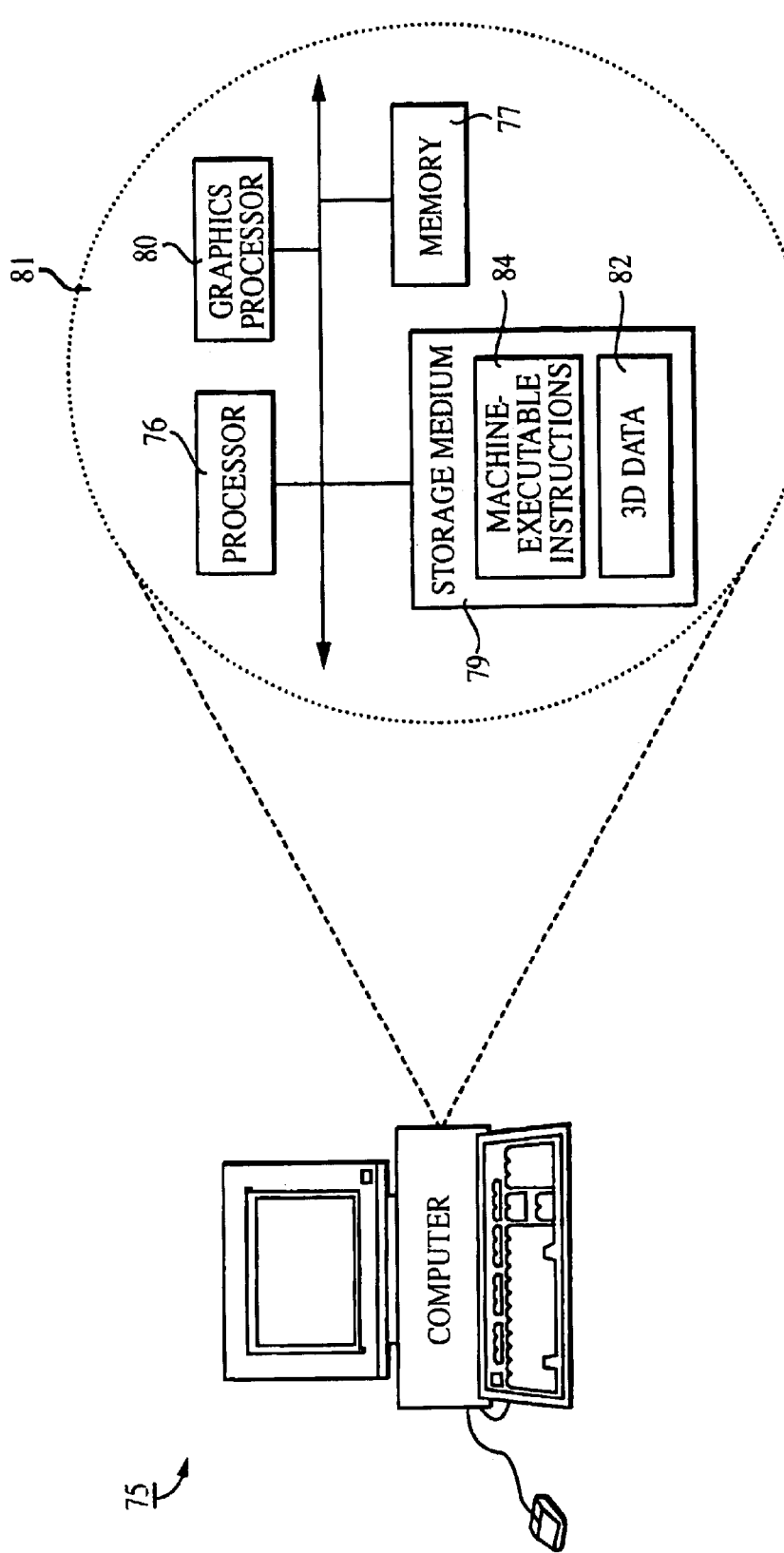
FIG. 11 is a block diagram of a computer system on which the process of FIG. 5 may be implemented.

FIG. 11 shows a computer 75 for rendering non-photorealistic images using process 27. Computer 75 includes a processor 76, a memory 77, a storage medium 79 (e.g., a hard disk), and a 3D graphics processor 80 for repositioning a 3D model and manipulating 3D data (see view 81). Storage medium 79 stores 3D data 82 which defines a 3D model, and computer instructions 84 which are executed by graphics processor 80 out of memory 77 to render shaded images using process 27 and 3D data 82. Memory 77 also stores the bins noted above.

Process 27 is not limited to use with the hardware and software of FIG. 11; it may find applicability in any computing or processing environment and with any type of machine that is capable of running a computer program. Process 27 may be implemented in hardware, software, or a combination of the two. Process 27 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform process 27 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer or other machine for configuring and operating the computer when the storage medium or device is read by the computer to perform process 27. Process 27 may also be implemented as a computer-readable storage medium, configured with a computer program, where, upon execution, instructions in the computer program cause the computer to operate in accordance with process 27.

Figure 6E:

Process 27 is not limited to the embodiments described above. For example, an edge 17a may have more than two points 52 and 53 if vertices do not belong to two adjacent bins. For example, if vertex 15a belongs to a bin having a shading level of FIG. 6b and adjacent vertex 15c belongs to a bin having a shading level of FIG. 6e, three points along edge 17a will be selected to indicate that there are four shading regions defined by the polygon.

Process 27 may also be performed in multiple passes. That is, process 27 may render a 2D image from 3D data and then progressively increase the granularity of polygons that make up the shading regions until the shading boundaries reach a desired precision. In this case, for example, process 27 may be performed on the areas 58 and 60 and the sub-polygons 63, 64 and 65 (see FIG. 7).

Process 27 is also not limited to use with cartoon and pencil-sketch shading techniques. Any type of non-photorealistic, or other, shading technique may be employed with process 27.

Other embodiments not described herein are also within the scope of the following claims.

What is claimed is:

1. A method of shading a polygon having different shadings that correspond to regions of a model having the different shadings, the polygon defining a border between the regions, the method comprising:
   identifying points on edges of the polygon using shading values for vertices of the polygon, one of the vertices belonging to one of the regions and another of the vertices belonging to a different one of the regions, the points corresponding to boundaries between the regions having the different shadings;
   connecting the points to each other across the polygon to form at least two areas within the polygon, the areas corresponding to the regions having different shadings; at least one area of the at least two area having a number of edges that is different from a number of edges in the polygon;
   tessellating the at least one area to produce sub-polygons having a same number of edges as the number of edges in the polygon; and
   shading the at least two areas differently so that each of the at least two areas has a same shading as its corresponding region.

2. The method of claim 1, further comprising:
assigning the vertices to at least two different bins, the bins corresponding to different shades;
wherein identifying comprises identifying points on edges of the polygon having vertices assigned to different bins.

3. The method of claim 2, wherein the vertices are assigned to the bins based on the shading values of the vertices.

4. The method of claim 1, wherein identifying comprises:
locating the points on the edges of the polygons by performing a linear interpolation using the shading values assigned to the vertices.

5. The method of claim 1, wherein tessellating comprises performing a subdivision process on the at least one area to obtain the sub- polygons.

6. The method of claim 1, wherein the polygon comprises a triangle and the shading comprises non-photorealistic shading.

7. A method of rendering a two-dimensional image from three-dimensional data, comprising:
projecting a polygon defined by the three-dimensional data onto a two-dimensional surface, the polygon having different shadings that correspond to two different regions of a model having the different shadings, the polygon defining a border between the regions;
subdividing the polygon into areas, wherein subdividing comprises identifying points on edges of the polygon and connecting the points to each other across the polygon, the points corresponding to borders between the different shadings, at least one of the areas having a number of edges that is different from a number of edges in the polygon;
tessellating the at least one area to produce sub-polygons having a same number of edges as the number of edges in the polygon;
assigning elements of the area to bins that correspond to the different shadings based on locations of vertices of the polygon in the regions; and
mapping predetermined shadings onto the areas to render the two- dimensional image, the mapping being performed so that the area have same shadings as corresponding verties of the polygon.

8. The method of claim 7, wherein the points on edges of the polygon are identified using shading values for vertices of the polygon.

9. The method claim 8, wherein identifying comprises locating the points on the edges of the polygon by performing a linear interpolation using the shading values for the vertices.

10. An artice comprising:
a machine-readable medium that stores executable instructiions for shading a polygon having different shading that corresponds to regions of a model having the different shadings, the polygon defining a border between the regions, the instrustions causing a machine to:
identify points on edges of the polygon using shading values for vertices of the polygon, one of the vertices belonging to one of the regions and another of the vertices belonging to a different one of the regions, the points corresponding to boundaries between the regions having the different shadings;
connect the points to each other across the polygon to form at least two areas within the polygon, the areas corresponding to the regions having different shadings, at least one area of the at lest two areas having a number of edges that is different from a number of edges in the polygon;
tessellate the at least one area to produce sub-polygons having a game number of edges as the number of edges in the polygon; and
shade the at least two areas differently so that each of the at least two areas has a same shading as its corresponding region.

11. The article of claim 10, further comprising instructions that cause the machine to:
assign the vertices to at least two different bins, the bins corresponding to different shades;
wherein identifying comprises identifying points on edges of the polygon having vertices assigned to different bins.

12. The article of claim 11, wherein the vertices are assigned to the bins based on the shading values of the vertices.

13. The article of claim 10, wherein identifying comprises:
locating the points on the edges of the polygons by performing a linear interpolation using the shading values assinged to the vertices.

14. The article of claim 10, wherein tessellating comprising performing a subdivision process on the at least one area to obtain the sub- polygons.

15. The article of claim 10, wherein the polygon comprises a triangle and the shading comprises non-photorealistic shading.

16. An articel comprising:
a machine-readable medium that stores executable instructions for rendering a two- dimensional image from the three-dimensional data, the instructions causing a machine to:
project a polygon defined by the three-dimensional data onto a two- dimensional surface, the polygon having different shadings that correspond to two different regions of a model having the different shadings, the polygon defining a border between the regons;
subdivide the polygon into areas, wherein subdividing comprises identifying points on edges of the polygon and connecting the points to each other across the polygon, the points corresponding to borders between the different shadings, at least one of the areas having a number of edges that is different from a number of edges in the polygon;
tessellate the at least one area to produce sub-polygons having a same number of edges as the number of edges in the polygon;
assign elements of the areas to bins that correspond to the different shadings based on locations of vertices of the polygon in the regions; and
map predetermined shadings onto the areas to render the two-dimensional image, mapping being performed so tht the areas have same shadings as corresponding vertices of the polygon.

17. The article claim 16, wherein the points on edges of the polygon are identified using shading values for vertices of the polygon.

18. The artice of claim 17, wherein identifying comprises locating the points on the edges of the polygon by performing a linear interpolation using the shading values for the vertices.

19. An apparatus for shading a polygon having different shadings that corresponds to regions of a model having the different shadings, the polygon defining a border between the regions, the apparatus comprising:

a processor that executes instructions to identify points on edges of the polygon usig shading value for vertices of the polygon, one of the vertices belonging to one of the regions and another of the vertices belonging to a different one of the regions, the points corresponding to boundaries between the regions having the different shadings;

connect thre points to each other across the polygon to form at least two areas within the polygon, the areas corresponding to the regions having different shadings, at least one area of the at least two areas having a number of edges that is different from a number of edges in the polygon;

tessellate the at least one area to produce sub-polygons having a same number of edges as the number of edges in the polygon; and shade the at least two areas differently so that each of the at least two areas has a same shading as its corresponding region.

20. The apparatus of claim 19, wherein:

the processor executes instructions to assign the vertices to at least two different bins, the bins corresponding to differnt shades; and identifying comprises identifying points on edges of the polygon having vertices assigned to different bins.

21. The apparatus of claim 21, wherein the vertices are assigned to the bins based on the shading values of the vertices.

22. The apparatus of claim 19, wherein the processor identifies the points by locating the points on the edges of the polygons by performing a linear interpolation using the shading values assigned to the vertices.

23. The apparatus of claim 19, wherein tessellating comprises performing a subdivision process on the at least one area to obtain the sub- polygons.

24. The apparatus of claim 19, wherein the polygon comprises a triangle and the shading comprises non-photorealistic shading.

25. An apparatus for rendering a two-dimensional image from three-dimensional data, comprising:

a processor that executes instructions to:

project a polygon defined by the three-dimensional data onto a two- dimensional surface, the polygon having different shadings that correspond to two different regios of a model having the different shadings, the polygon defining a border between the regions;

subdivide the polygon into areas, wherein subdividing comprises identifying points on edges of the polygon and connecting the point to each other across the polygon, the points corresponding to borders between the different shadings, at lest one of the areas having a number of edges that is different from a number of edges in the polygon;

tessellate the at least one area to produce sub-polygons having a same number of edges as the number of edges in the polygon;

assign elements of the areas to bins that corresponds to the different shadings based on locations of vertices of the polygon in the regions; and map predetermined shadings into the areas to render the two- dimensional map, mapping being performed so that the areas have same shadings as corresponding vertices of the polygon.

26. The apparatus of claim 25, wherein the points on edges of the polygon are identified using shading values for vertices of the polygon.

27. The apparatus of claim 26, wherein identifying comprises locating the points on the edges of the polygon by performing a linear interpolating using the shading for the vertices.

\* \* \* \* \*